(12) United States Patent
Perkov

(10) Patent No.: US 11,416,473 B2
(45) Date of Patent: Aug. 16, 2022

(54) USING PATH ENCODING METHOD AND RELATIONAL SET OPERATIONS FOR SEARCH AND COMPARISON OF HIERARCHIAL STRUCTURES

(71) Applicant: Oracle International Corporation, Redwood Shores, CA (US)

(72) Inventor: Evgueni Perkov, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 94 days.

(21) Appl. No.: 16/808,152

(22) Filed: Mar. 3, 2020

(65) Prior Publication Data
US 2021/0191919 A1    Jun. 24, 2021

Related U.S. Application Data

(60) Provisional application No. 62/951,620, filed on Dec. 20, 2019.

(51) Int. Cl.
*G06F 16/23* (2019.01)
*G06F 16/22* (2019.01)
*G06F 16/28* (2019.01)

(52) U.S. Cl.
CPC ...... *G06F 16/2365* (2019.01); *G06F 16/2246* (2019.01); *G06F 16/288* (2019.01)

(58) Field of Classification Search
CPC .. G06F 16/2455; G06F 16/283; G06F 16/252; G06F 16/2246; G06F 16/2365
See application file for complete search history.

(56) References Cited

U.S. PATENT DOCUMENTS

| 6,240,188 B1 * | 5/2001 | Dondeti | H04L 12/18 380/284 |
|---|---|---|---|
| 2003/0009474 A1 * | 1/2003 | Hyland | G06F 16/9027 |
| 2003/0208495 A1 * | 11/2003 | Andreev | G06F 16/2246 |
| 2016/0335303 A1 * | 11/2016 | Madhalam | G06F 16/252 |
| 2017/0316041 A1 * | 11/2017 | Delaney | G06F 16/2237 |
| 2019/0317940 A1 * | 10/2019 | Bauer | G06F 17/11 |

OTHER PUBLICATIONS

Shankar Pal. Istvan Cseri et al. Indexing XML Data Stored in a Relational Database; Microsoft Corporation; Redmond Washington, USA; 12 pages.

* cited by examiner

*Primary Examiner* — Taelor Kim
(74) *Attorney, Agent, or Firm* — Trellis IP Law Group, PC

(57) ABSTRACT

Example embodiments facilitate creation of efficient tree structures (and strategic modification of and manipulation of existing tree structures), such that the resulting tree structures enable rapid computing operations, including, but not limited to, rapid relational set operations (e.g., joining trees, comparing tree structures, determining structural similarities of trees, adding tree nodes, removing or replacing tree nodes, accessing tree data, updating tree data, and so on). An example method relates to a method and/or system for creating and manipulating tree data structures (also simply called trees herein) as, for example, in relational databases. One embodiment uses compact bit-wise path encoding that stores structural data related to tree branches to which a current node belongs. The embodiment facilitates manipulating a representation of a tree and includes traversing at least a portion of the tree from a starting node, and then for each traversed node, modifying node metadata depending on whether or not the traversed node is a sibling node or a child node.

16 Claims, 8 Drawing Sheets

USING PATH ENCODING METHOD AND RELATIONAL SET OPERATIONS FOR SEARCH AND COMPARISON OF HIERARCHIAL STRUCTURES

CROSS REFERENCES TO RELATED APPLICATIONS

This application claims the benefit of U.S. Provisional Patent Application Ser. No. 62/951,620, entitled USING PATH ENCODING METHOD AND RELATIONAL SET OPERATIONS FOR SEARCH AND COMPARISON OF HIERARCHICAL STRUCTURES, filed on Dec. 20, 2019, which is hereby incorporated by reference as if set forth in full in this application for all purposes.

BACKGROUND

The present application relates to computing, and more specifically, to software, systems, and accompanying methods and mechanisms for facilitating performing computing operations using data stored in hierarchal tree structures.

Systems and methods for efficiently accessing, manipulating, and using data stored in hierarchical trees are employed in various demanding applications, including enterprise database applications, business analytics software, cloud-based concurrent processing applications, and so on. Such applications often demand tree structures that enable efficient tree operations, such as comparing tree structures, adding nodes, searching the tree structures, joining tree structures or portions thereof, and so on.

Efficient tree structures and associated methods and mechanisms can be particularly important in large enterprise cloud-based database applications, where any computing inefficiencies can impact enterprise revenue and disgruntle customers.

SUMMARY

Generally, embodiments relate to a method and/or system for facilitating creating and manipulating tree data structures (also simply called trees herein) as, for example, in relational databases. One embodiment uses compact path encoding that stores structural data related to tree branches (where in specific example embodiments, the tree branches are binary path branches) to which a current node belongs. A bit-wise (e.g., binary) data format is disclosed.

Example embodiments facilitate creation of efficient tree structures (and strategic modification of existing tree structures), such that the resulting tree structures enable rapid computing operations, including, but not limited to, rapid relational set operations (e.g., joining trees, comparing tree structures, determining structural similarities of trees, adding tree nodes, removing or replacing tree nodes, accessing tree data, updating tree data, and so on).

Generally, various embodiments involve use of strategic metadata that is included in or otherwise associated with each node of a given tree structure. The strategic metadata encodes information describing familial relationships of each node relative to other sibling and/or parent nodes. This strategic metadata is usable to ascertain descriptions of each branch (e.g., corresponding to tree binary path branches, as discussed more fully below) of a give tree structure associated with a given node. The metadata of all leaf nodes (where in specific example embodiments, the leaf nodes of interest are tree binary path terminators, as discussed more fully below) of a given tree structure describes the entire tree structure. This description can then be used to facilitate efficient tree-based operations.

Furthermore, various embodiments disclose a simple bit-wise (i.e., binary) implementation of the tree metadata in combination with a novel representation of tree structures as collections of tree binary path branches terminated by binary path terminators (where the binary path terminators represent a special type of leaf node in specific example embodiments), which enable further efficiencies, as discussed more fully below.

An example method for manipulating a representation of at least a portion of a tree includes traversing the at least a portion of the hierarchical tree from a starting node; and for each traversed node modifying a representation value depending on whether the traversed node is a sibling node or a child node.

In a more specific embodiment, the representation value is or otherwise includes a binary number. The specific example method further includes modifying the representation value by appending a one (i.e., "1") or a zero (i.e., "0") to the representation value depending on whether or not a traversed node is a sibling node or a child node, respectively.

The specific example method may further include using the representation value to perform one or more relational database functions, such as one or more of UNION, INTERSECTION, or DIFFERENCE.

The specific example method for facilitating efficient tree operations may further include, or an alternative method may include: receiving a request for a new node that is to be added to a tree; ascertaining whether or not the new node is a child node of a second node, and encoding parent relationship information in or in association with the new node in response to the ascertaining; determining whether or not the new node is a sibling node of another node, and encoding sibling relationship information in or in association with the new node in response to the determining; and updating the tree structure with the new node, resulting in a new tree structure with the new node.

The specific example method may further include determining preexisting metadata describing familial relationship information of the parent node and/or of the sibling node of the new node; and appending, to the familial relationship information, new metadata for the new node describing the parent relationship information and/or sibling relationship information of the new node.

The familial relationship information may include parent relationship information and/or sibling relationship information of the parent node and/or sibling node of the new node.

The encoding of parent relationship information may further include using one or more symbols to specify the parent relationship information. The one or more symbols may be binary symbols. The step of using one or more symbols may further include appending a first binary symbol to preexisting metadata characterizing one or more familial relationships of the parent node and/or the sibling node.

Similarly, encoding sibling relationship information may further include using one or more symbols to specify the sibling relationship information. The one or more symbols may be binary symbols, and the step of using one or more symbols may further include appending a first binary symbol to preexisting metadata characterizing one or more familial relationships of the parent node and/or the sibling node.

The specific example method may further include detecting a request to perform a relational set operation on the tree; and accessing metadata of special leaf nodes (called binary path terminator nodes in example specific embodiments) of the tree to facilitate performing the relational set operation.

The metadata of binary path terminator nodes includes a description of one or more branches (called binary path branches in example specific embodiments) of the tree and further includes the parent relationship information and the sibling relationship information (if applicable).

Accordingly, various embodiments discussed herein employ an efficient description of familial relationships of each node of a given tree. This description, which represents a type of node metadata, is then usable to implement efficient computing operations. For instance, structures of different trees can be readily compared simply by analyzing the metadata of the binary path terminator nodes of each tree subject to comparison.

Furthermore, the bit-wise implementation of the node metadata enables further efficiencies; not just in terms of ease of implementation, but ease of associated computing operations on or in relation to each node of a tree. Rapid low-level bit operations can now enable ascertaining the nature of a given hierarchical structure of a given tree. Furthermore, use of binary path representations of tree structures enables further efficiencies by reducing the number of leaf nodes (and instead using binary path terminators in lieu of conventional leaf node characterizations and path labeling) that must be used to precisely describe a given tree for the purposes of the relational set operations and/or other operations.

In addition, tree structure information is now readily obtainable without querying the entire tree. Each node of a tree may store non-local structure information, i.e., metadata describing a particular branch (i.e., binary path branch) of the tree. Additional computing efficiencies result from a unique "orthogonal" characterization of paths or branches comprising a given tree, as discussed more fully below.

A further understanding of the nature and the advantages of particular embodiments disclosed herein may be realized by reference of the remaining portions of the specification and the attached drawings.

DETAILED DESCRIPTION OF EMBODIMENTS

Figure 1:
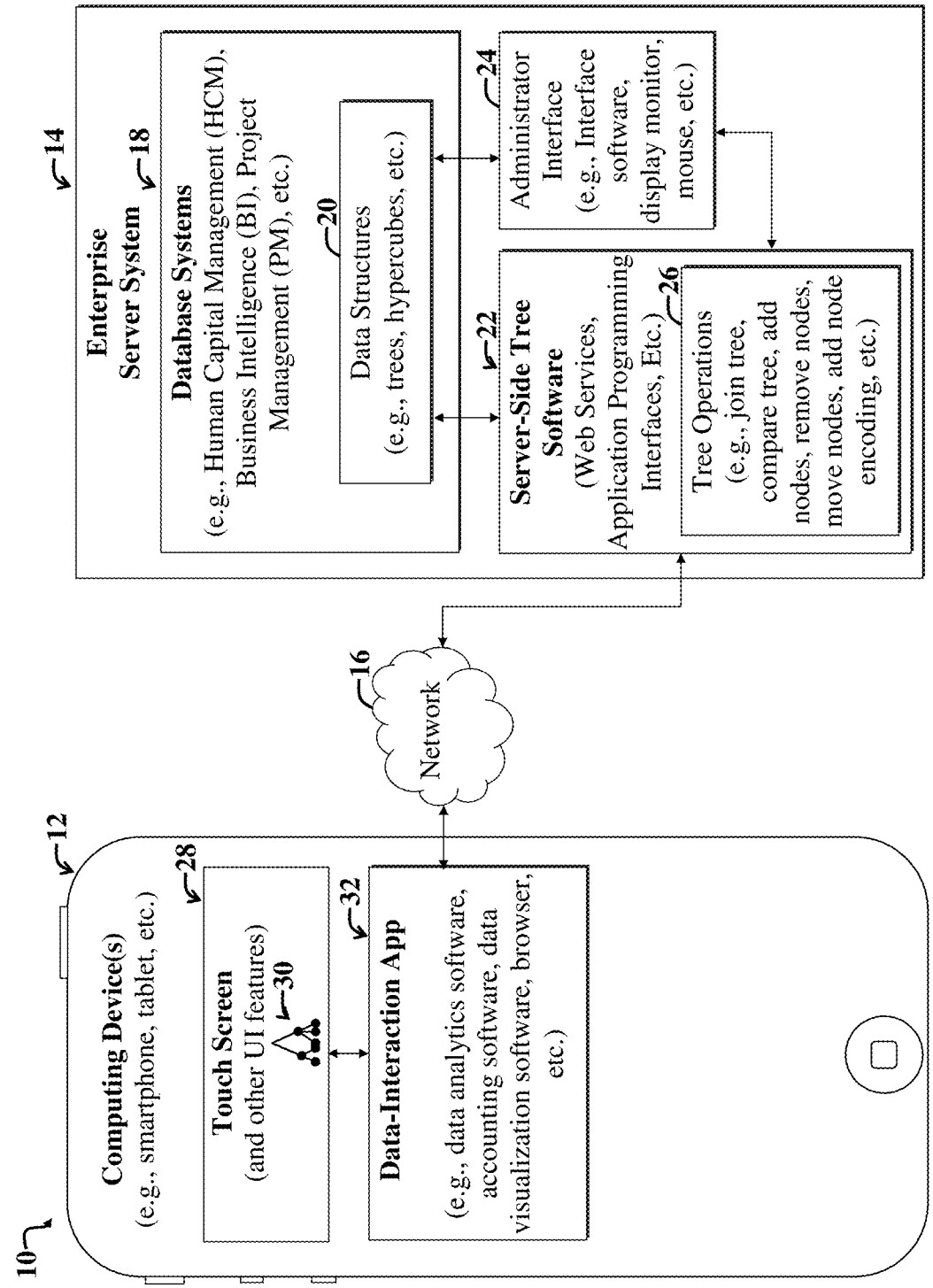
FIG. 1 illustrates a first example system and accompanying computing environment employing specialized tree software to enable the building of efficient tree structures (i.e., trees and accompanying tree hierarchies); to enable the conversion of inefficient tree structures into more efficient tree structures; to facilitate construction of efficient tree structures, and to implement efficient computing operations using the tree structures.

For the purposes of the present discussion, a tree may be any data structure characterized by one or more hierarchies.

A hierarchy may be any arrangement of data, where different data in the arrangement may exhibit superior or subordinate relationships with other data.

A tree hierarchy may be a hierarchy characterized by a group of related nodes, e.g., related by attributes, dimensions, labels, data objects, etc., which may be arranged in levels, where higher levels are characterized by nodes that exhibit superior relationships relative to nodes of lower levels. Higher level nodes are called parents, grandparents, etc., of related lower level nodes, e.g., child nodes, grandchild nodes, and so on.

A tree hierarchy, also called a tree structure herein, may exhibit nodes corresponding to data dimensions and/or leaf data. Leaf data may represent data of the lowest level node (called a leaf node) along any branch of the tree structure, such that the leaf node lacks any child nodes.

The entire structure of the tree hierarchy can represent a collection of branches. A branch may be any path of the structure between nodes. Generally, the branches discussed herein represent paths from a top level or parent node to sub-nodes, e.g., child nodes, grandchild nodes, and so on. Nodes at the same level of a hierarchy are called sibling nodes herein.

Depending upon the context in which the terms tree and hierarch are employed, a tree may refer to both the hierarchy describing the tree and the data in the tree. The term hierarchy may refer to the particular structure or architecture of the tree. However, in certain instances, a particular tree may be referred to by the nature of its structure, i.e., its hierarchy. Furthermore, in certain contexts herein, the terms tree and tree structure are employed interchangeably to refer to both the hierarchical structure of a given tree and the data stored therein or maintained in association with nodes thereof.

Tree hierarchies, also called data hierarchies herein, may be categorized as explicit and/or implicit hierarchies. Explicit hierarchical representations of data are organized according to hierarchical relationships inherent within the data. Such hierarchical relationships are often based on persistent data attributes characterizing the data. An example of an extrinsic hierarchy includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

Data manipulations, such as searching for, and performing operations on or with, specified sub-hierarchies (sub-trees) inside larger hierarchies (trees) can be a computationally difficult problem. The sizes of the trees and sub-trees, along with the complexity of the structures; the desire to return a result quickly; and other factors, require that the tree structures and their operations be implemented efficiently.

Embodiments discussed herein enable efficient implementation of computing tasks, such as searching for patterns in sub-trees, via relational databases. Other computing tasks include, for example, implementing various database operations on tree structures; operations such as SELECT, INSERT, DELETE, and UPDATE.

Embodiments discussed herein facilitate optimizing such operations for speed and computing-resource consumption efficiency.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

For clarity, certain well-known components, such as hard drives, processors, operating systems, power supplies, routers, Relational DataBase Management Systems (RDBMSs) and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment employing specialized tree software 22 to enable the building of efficient tree structures (i.e., trees and accompanying tree hierarchies, as exemplified by a displayed tree 30 on a touch screen 28 of a computing device 12); to enable the conversion of inefficient tree structures into more efficient tree structures; to facilitate construction of efficient tree structures, and to implement efficient computing operations using the tree structures (also simply called trees herein).

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, server-side tree software 22 is shown separately relative to database systems 18. However, various features and functionality of the server-side tree software 22 may be implemented in or otherwise be considered part of the database systems 18, without departing from the scope of the present teachings.

The example system 10 includes one or more computing devices 12 (e.g., mobile device, desktop computer, or other device) in communication with an enterprise server system 14 via network 16, such as the Internet. The example computing device 12 includes a touch screen 28 (or other viewing mechanism, e.g., computer monitor) in communication with client-side software, such as a data-interaction application 32. The data-interaction application 32 may include and/or represent data analytics software, accounting software, data visualization software, a browser, and/or other software.

The data-interaction application 32 is adapted to communicate with modules 18-26 of the enterprise server system 14, including example server-side tree software 22. The example tree software 22 includes software functionality for communicating with the client-side data-interaction application 32 and further includes functionality for implementing tree operations 26 on tree data structures 20 of server-side database systems 18 in response to request messages (also simply called requests) issued by the client-side data-interaction application 32. In the present example embodiment, the database systems 18 may include one or more relational databases, Relational DataBase Management Systems (RDBMSs), and so on, as required to meet the needs of a particular implementation.

For the purposes of the present discussion, software functionality may be any function, capability, or feature, e.g., stored or arranged data, that is provided via computer code, i.e., software. Software functionality may include actions, such as servicing client-side request messages, performing relational set operations, adjusting metadata include that is in or that is associated with tree nodes or other data objects, and so on.

The example server-side tree software 22 may be implemented via one or more web services and/or Application Programming Interfaces (APIs). The example server-side tree software 22 includes software functionality for implementing various tree operations 26. Example tree options include selectively joining different trees (e.g., using a UNION operation or function), adding nodes to a tree; comparing different trees or portions thereof (e.g., using a DIFFERENCE operation or function), removing nodes from a tree, adding nodes to a tree, adding metadata (e.g., using bit-wise encoding) describing familial relationships of a particular node relative to adjacent nodes and ancestor nodes, and so on.

Figure 2:
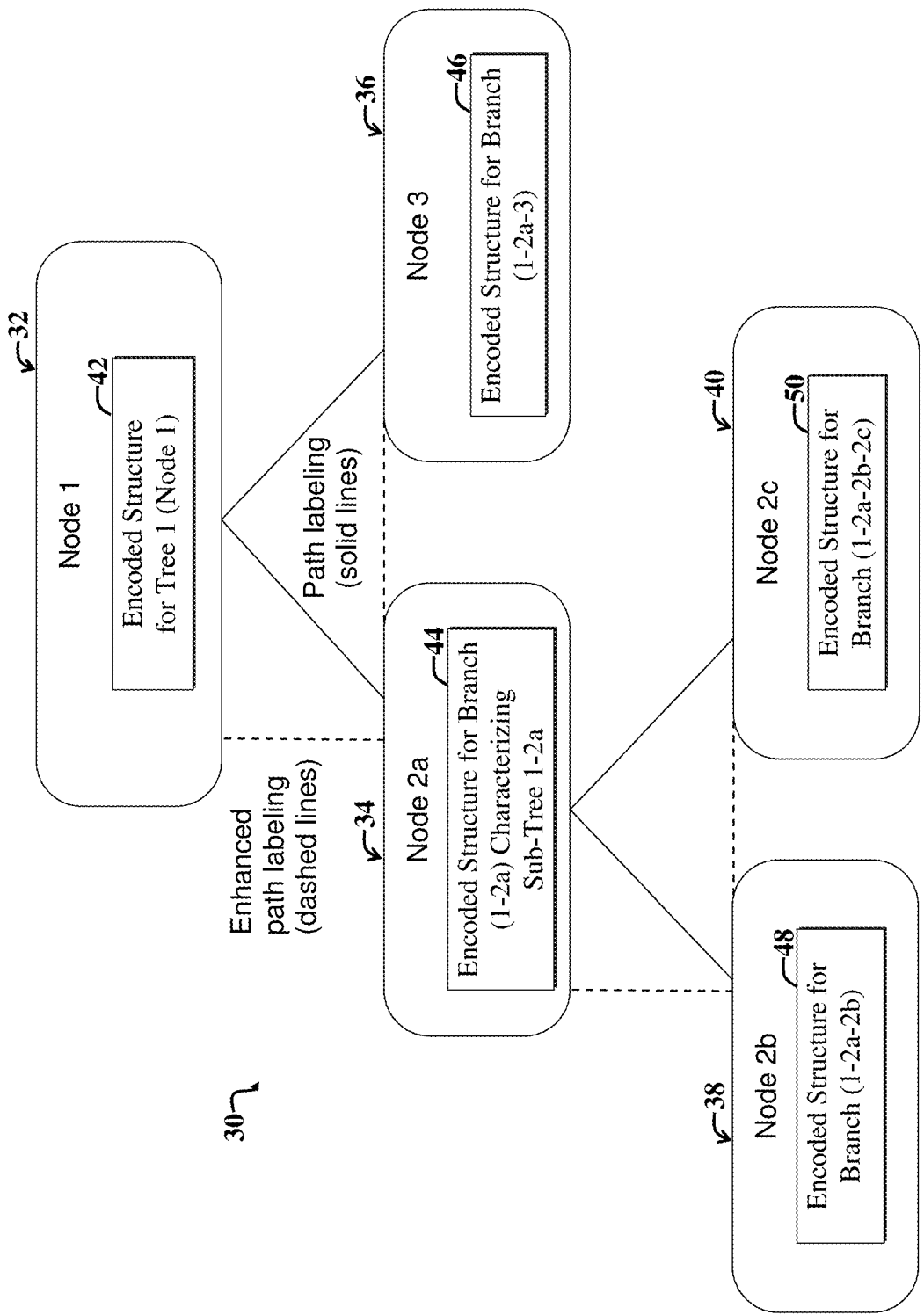
FIG. 2 illustrates a first example tree structure, where each node of the tree structure is augmented with strategic metadata to facilitate efficient computing operations using the tree structure.

FIG. 2 illustrates a first example tree structure 30, where each node 32-40 of the tree structure 30 is augmented with strategic metadata (corresponding to blocks 42-50) to facilitate efficient computing operations using the tree structure 30 (also simply called the tree 30 herein).

The example tree structure 30 is characterized by a hierarchy that includes a first root node 32, which acts as a parent of immediate sub-nodes 34, 36, and as a grandparent of other nodes 38, 40 that are children of a first sub-node 34 (node 2a). Note that conventionally, relationships between the parent node 32, child nodes 34, 36, and relationships between the child nodes 34, 36 and their child nodes 38, 40 (i.e., grandchild nodes of the root node 32) are illustrated using solid lines, without labeling lines for relationships between sibling nodes, e.g., sibling nodes 34, 36, and the sibling nodes 38, 40.

In the present example embodiment, dashed lines indicate familial relationships (e.g., parent-child relationships and sibling relationships) that are described by the node metadata 42-50. The node relationships indicated by that dashed orthogonal lines are used to describe or characterize the entire tree 30. Note that conventionally, encoded structure data 46, 50 of leaf nodes 36-40, respectively, is used to characterize the entire tree 30, which represents a collection of branches extending from the root node 32 to each leaf node 36-40. However, in the present example embodiment, which employs the relationships represented by the dashed lines (called binary paths, as discussed more fully below), only so-called path terminators 36, 40 and associated encoded structure data (e.g., binary metadata) 46, 50 are needed to describe the ancestry of the entire tree 30, as discussed more fully below.

In the present example embodiment, the dashed lines represent tree binary paths (also simply called binary paths herein), as binary metadata describing the paths is included in or is otherwise associated with each node along a given path. Binary paths extending from the root node (node 1) 32 to a given node that has no children (e.g., nodes 3 and 2c)

36, 40 are called tree binary path branches (or simply binary path branches herein). The nodes 36, 40 with no children at the end of a given binary path branch are called binary path terminators herein, and they represent a type of leaf node.

When a tree, such as the tree 30 is characterized by the dashed lines and associated binary paths and branches, the tree 30 is said to exhibit a tree binary path representation (also simply called binary path representation herein). In the binary path representation of the tree 30, the only child node that is directly connected to its parent node is the oldest child. For instance, the third node 36 (a binary path terminator) is younger than the sibling node 34. Similarly, the binary path terminator node 2c 40 is younger than its sibling node 2b 38.

Note that while in the present example embodiment, node age is used to set the binary paths between siblings, embodiments are not limited thereto. Other types of organizations and associated node ordering are possible, without departing from the scope of the present teachings.

Note that the conventional solid-line representation of the tree 30 exhibits three leaf nodes 36-40, where the leaf nodes are tree nodes that have no children. However, the dashed-line binary path representation has only two terminator nodes 36, 40. However, encoded structure data 46, 50 for the two terminator nodes 36, 40 is sufficient to describe the entire ancestry of the tree 30 for the purposes of tree operations (e.g., relational set operations). Note that generally, non-local metadata about an entire binary path branch is stored in (or in association with) its binary path terminator node, as discussed more fully below.

The reduction in the requisite number of binary path terminator nodes relative to the number of conventional leaf nodes can be substantial for some tree structures. This can yield substantial computational efficiencies (relative to conventional tree characterizations) when performing tree operations. For instance, in some implementations, a given tree may have more than four times fewer binary path terminators than conventional leaf nodes. Tree operations using fewer nodes can yield associated computational efficiencies.

In summary, tree binary path terminators may be leaf nodes that have no younger siblings, such that the binary path terminators are the youngest siblings in their family that also have no children of their own. Tree binary path branch may be a path from a root of the tree to a binary path terminator node, where the path uses binary links between nodes.

Generally, the number of binary path terminators is less than the number of conventional leaf nodes. Therefore, a tree can be represented by a less (usually much less) number of binary path branches relative to conventional branches.

A set of metadata structures 46, 50 encoding the entire tree 30 will be smaller (and often much smaller) in that case. As a result, most of relational set operations proposed by embodiments discussed herein will run faster (and often noticeably faster) when a tree is encoded via binary path branches as discussed herein.

Accordingly, each node 32-40 of the tree structure 30 (also simply called tree 30 herein) is augmented with respective metadata 42-50, which describes not just immediate familial relationships (e.g., provides information indicating whether or not a given node is a child and/or a sibling of a particular node), but also incorporates metadata of any parent node; thereby incorporating a description of an entire branch of the tree structure 30 from the root node 32 to the particular node (e.g., one of the nodes 36, 40).

In the present example embodiment, a first instance of encoded structure data 42 represents metadata that describes the root node 32 of the tree 30. The encoded structure data 32 would indicate that the first node 32 has zero parents and zero siblings.

In the case that the first node 32 represents a root node of a sub-tree of a larger tree, the encoded structure data 42 would not only describe or indicate a parent node of the first node 32, but may further indicate that the first node 32 is a sibling of another node of the larger tree that includes the tree 30. The encoded structure data 42 would further include information describing any parent node of the first node 32. Similarly, encoded structure data of such parent node would include the encoded structure data of any parent node.

Accordingly, the encoded structure data 42 (which may be implemented using bit-wise encoding, as discussed more fully below) not only describes immediate familial relationships (pertaining to any adjacent nodes) of the first node 32, but further describes any parent nodes (and associated ancestry along a given binary path branch to a root node) of the first node 32, as discussed more fully below. In this way, the encoded structure data 42 essentially describes or characterizes the entire binary path branch of any larger tree that the first node 32 is a part of.

The encoded structure data 42 is said to also describe or characterize the entire tree 30, to the extent that the first node 32 that includes (or is otherwise associated with) the encoded structure 42 is the parent node of the sub-nodes 34-40. As such, metadata represented by the encoded structure data 42 will be included in corresponding encoded structure data 44-50 of the respective sub-nodes 34-40, as discussed more fully below.

A first child node 34 (i.e., node 2a) of the first node 32 also includes first child encoded structure data 44. The first child encoded structure data 44 includes encoded metadata describing not only immediate familial relationships of the first child node 34 (e.g., describing or indicating that the first child node 34 is a child of the first node 32), but further incorporates the encoded structure data 42 of the parent node 32. Note that the first child encoded structure data 44 will be incorporated into corresponding structure data of grandchild nodes 38-40 of the root node 32.

Second child encoded structure data 46 for a second child node 36 of the root node 32 includes metadata describing immediate familial relationships of the second child node 36 (also called the third node herein), and further incorporates the encoded structure data 42 of the parent root node 32. More specifically, the encoded structure data 46 for node 36 incorporates metadata 44 for its immediate older sibling, i.e., node 34, which in turn incorporates metadata 42 of the root node 32. Accordingly, any child node that is not an oldest child of a given parent node inherits its metadata from the immediate older sibling. The oldest child of a given parent node inherits its metadata from the parent.

Note that, in certain embodiments discussed herein, if the third node 36 (second child node of the root node 32) is added to the tree 30 after the first child node 34 (i.e., node 2a), then the second child encoded structure data 46 will also incorporate the first child encoded structure data 44.

A first grandchild node (also called node 2b) of the root node 32 includes or is otherwise associated with first grandchild encoded structure data 48. The first grandchild encoded structure data 48 includes metadata indicating, for instance, that the first grandchild node 38 is a child node of the first child node 34. The first grandchild encoded structure data 48 further includes data describing an ancestry of the first child node 34, i.e., incorporates the first child encoded structure data 44. Recall that the first child encoded structure data 44 describes a branch or path (from the root node 32) that the first child node 34 belongs to.

Similarly, the first grandchild encoded structure data 48 will further describe or indicate an ancestry of the first grandchild node 38, i.e., will describe a branch of the tree 30 that represents a path from the root node 32 through the first child node 34, to the first grandchild node 38.

Similarly, a second grandchild node 40 includes second grandchild encoded structure data 50, which not only describes immediate familial relationships (e.g., that the second grandchild node 40 is a child of the first child node 34, and that the second grandchild node 40 is a sibling of the first grandchild node 38), but further incorporates the first child encoded structure data 44.

Accordingly, the second grandchild encoded structure data 50 may describe a branch or path from the root node 32 to the first child node 34 to the second grandchild node 40. If the second grandchild node 40 was added to the tree 30 after the first grandchild node 38, then the second grandchild encoded structure data 50 will further incorporate the first grandchild encoded structure data 48 of the first grandchild node 38.

Figure 3:
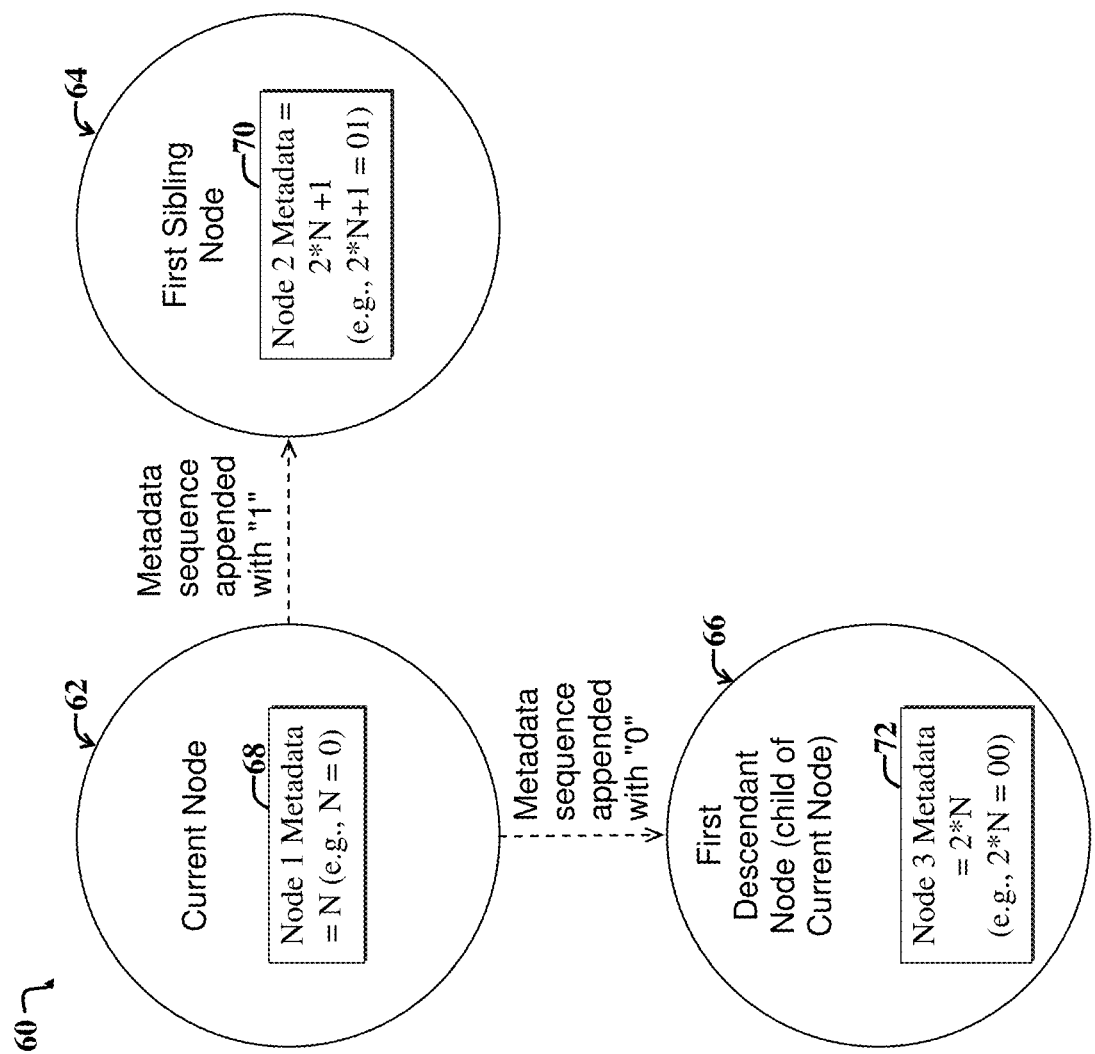
FIG. 3 illustrates a second example tree structure characterized by a bit-wise representation of node metadata characterizing node familial relationships (as represented by labeling of adjacent sibling or child nodes in the tree structure).

FIG. 3 illustrates a second example tree structure 60 characterized by a bit-wise representation of node metadata 68-72 characterizing node familial relationships (e.g., as represented, in part, by labeling of adjacent sibling or child nodes in the tree structure 60).

The second example tree structure 60 includes a current node 62, which represents the top-level parent node, i.e., root node, of the second example tree structure 60. The current node 62 includes a first sibling node 64 and a first descendant node 66, also called a child node of the current node 62.

The current node 62 includes or is otherwise associated with first metadata 68, which includes a bit-wise (i.e., binary) representation (e.g., in this case "0") indicating whether or not the node (e.g., when the node was added to the tree 60 or when the tree 60 was first created) is a child of another node.

Second metadata 70 of a first sibling node 64 represents a bit-wise representation of metadata describing its familial relationship with the current node 62. In this case the metadata "01" indicates, via the "0" that it was added to the second example tree structure 60 after the current node 62 (or the metadata 70 was otherwise modified to suggest such). The "1" may indicate, for instance, that the first sibling node 64 is a sibling of the current node 62 (i.e., on the same level of the hierarchical structure of the tree 60 and is a child of the current parent node 62).

Similarly, a first descendant node 66 includes or is associated with third example metadata 72. The third example metadata 72 includes a bit-wise description (i.e., binary representation) of familial relationships of the first descendant node 66 with any immediate nodes, e.g., the current node 62. For instance, the third example metadata 72 includes a first "0" indicating that it is a descendant of the current node 62. Accordingly, the first "0" may indicate that the node 66 is immediately related to the current node 62 (but the nature of this relationship not necessarily inferred from the first "0" alone). A second "0" may indicate that the node 66 is indeed a first descendant of the parent node 62.

Figure 4:
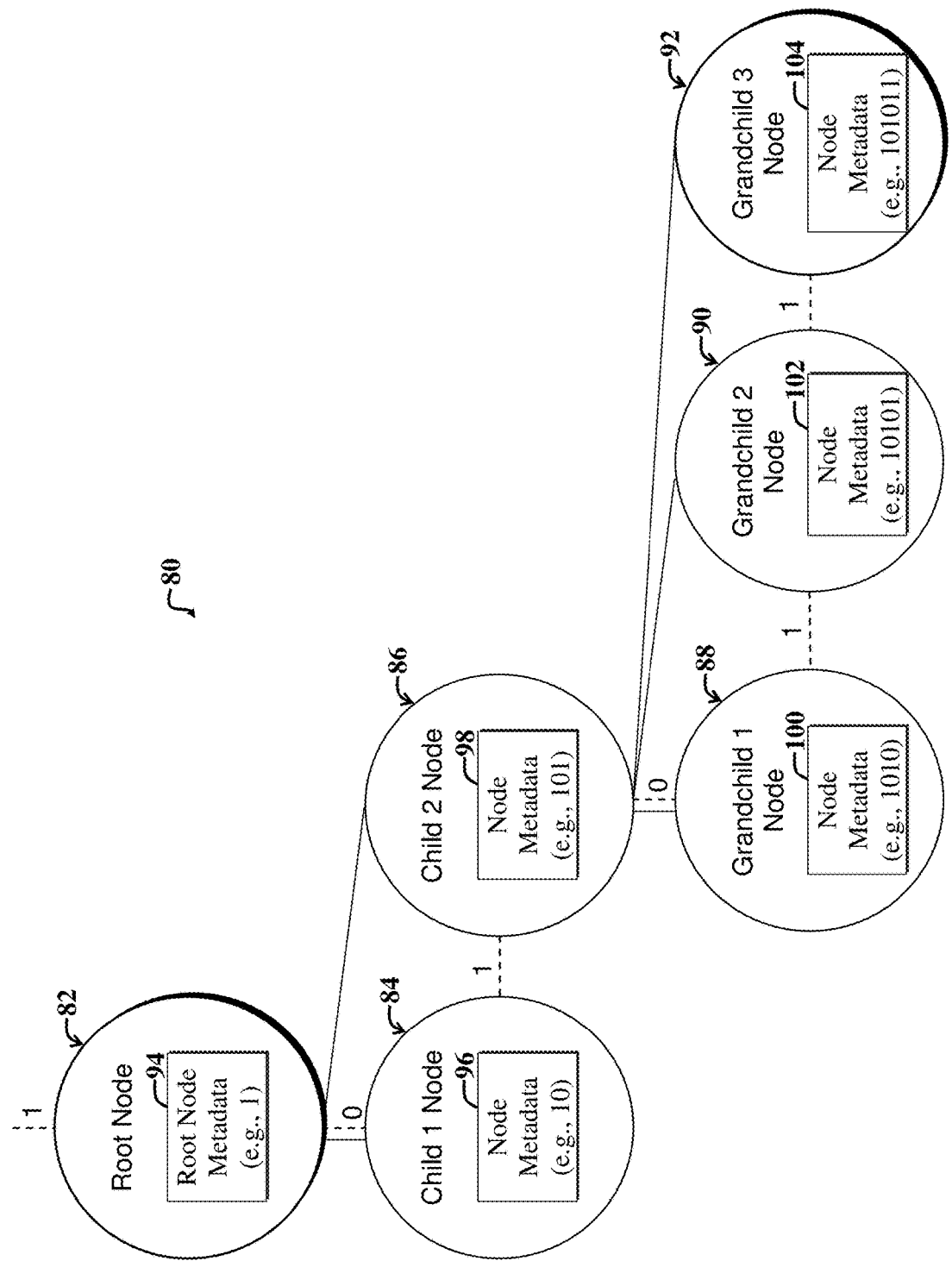
FIG. 4 illustrates a third example tree structure, which further illustrates an example of how node metadata (e.g., representing a path and/or branch description) can be constructed in accordance with one embodiment.

FIG. 4 illustrates a third example tree structure 80, which further illustrates an example of how node metadata (e.g., representing a path and/or branch description) 94-104 can be constructed in accordance with one embodiment.

Dashed lines and associated labels show bits that are added (to node metadata) at each level of the third example tree structure 80 as respective nodes 82-92 are added to the tree structure 80.

In summary, with reference to FIGS. 3 and 4, data manipulations, such as searching for and performing operations on or within specified sub-hierarchies (sub-trees) inside larger hierarchies (trees), can be a computationally difficult problem. The size of the trees and sub-trees, along with the complexity of the structures, the desire to return a result quickly, and other factors, require that the tree structures and their operations be implemented efficiently; and be implemented so that searching for patterns in sub-trees can be readily achieved with relational databases. Frequently used relational operations such as SELECT, INSERT, DELETE, and UPDATE should be optimized for speed.

Although specific data representations, database types, hardware or software components, programmatic techniques, or other details may be described, it should be apparent that variations in these designs and implementations are possible.

An embodiment stores non-local structural information in (or in association with) each node of a tree. One representation of the information, i.e., metadata, may be a binary number or string encoded as a native NUMBER data type within the programming language or general digital computing system. Depending on the language or system representation, the representation may be a binary number, packed bits, integer, character string, etc. Although embodiments are described herein with respect to a particular number representation it should be apparent that other representations may be possible.

By storing structural information in a number representation at nodes of a tree, the structural information about the tree or sub-tree can be obtained without querying the whole hierarchy. This also allows using simple relational set operations (UNION, INTERSECTION, DIFFERENCE) to establish equivalence of two hierarchies or to locate a smaller sub-tree inside a larger tree.

Embodiments use simple and compact path encoding that stores structural data related to the whole branch of the tree to which a current node belongs. A terminating node (called a binary path terminator node) of a branch can store information sufficient to describe a shape and nodes of that entire branch. The entire tree (hierarchy) can be described as a set of binary path branches. In other words, a set of binary path terminator nodes of the tree can be used to describe its entire structure.

Therefore, a task of comparing two trees can now be reduced to applying relational operation DIFFERENCE to two sets of nodes, i.e., the leaf nodes of a first tree and the leaf nodes of a second tree. This operation, and others, can be highly optimized in relational database management systems, such as, e.g., Oracle®, IBM®, Microsoft®, Teradata®, etc. and made to execute quickly even on large sets. Additionally, searching for relationships between different nodes of a tree can be implemented as low-level bit-wise operations using a programming language such as "C" or others. Aspects of the embodiments may work in concert with existing machine learning algorithms, automated pattern search and analysis.

A further understanding of the nature and the advantages of particular embodiments disclosed herein may be realized by reference of the remaining portions of the specification and the attached drawings.

FIGS. 3 and 4 illustrate a construction of a bit-wise format representation of a path in a tree segment according to an embodiment. In this approach, a path enumeration model uses a binary string of only "0" and "1" digits or symbols encoded as an integer number. Other representation models may be used.

Starting from a node whose label, "s," is known, the following pseudo-code is followed to label adjacent nodes:

```
BEGIN
    IF new node. i s s i b l i n g ( node ) THEN
        new node. l a b e l := node. l a b e l . '1'
    ELSE IF new node. i s c h i l d ( node ) THEN
        new node. l a b e l := node. l a b e l .'0'
    END IF
END
``` where the '.' operator means concatenation of two strings. These operations are also shown diagrammatically in FIG. 3.

For example, if the starting node label is 101 then a sibling node label will be 1011 and a child node label will be 1010. In an embodiment, the bit string is stored in an unsigned integer number.

FIG. 4 illustrates labeling adjacent sibling or child nodes. As shown, following the 'dashed' edges from the root to destination node "X" generates a complete label attached to the destination node ('101011' which also represents decimal 43). Using 'dashed' edges instead of traditional direct 'parent-child' ones brings some useful properties that allow implementation of many tree operations in an easy and well-performing manner.

With this type of bit-wise representation efficient, low-level bit operations can be used. A node (or a subtree, or tree or subset thereof) can be added to, removed from, or relocated inside a tree or subtree with a relabeling operation that can be fast and/or use less computing resources than prior or contemporary approaches.

Node numbers can be stored in physical tables using a native RDBMS (Relational Database Management System) data type (NUMBER). They can be indexed using regular B-tree index. Contents of tree nodes can be stored in the same or a separate table. Usage can be optimized for search of specified sub-tree (ordered or unordered) inside large tree, comparison of trees (tree diff operations), trees edits (find branches that need to be added/removed from a tree A to obtain tree B), etc. Structured Query Language (SQL) can be used as the target language with low level C code implemented as SQL functions in a native library.

Figure 5:
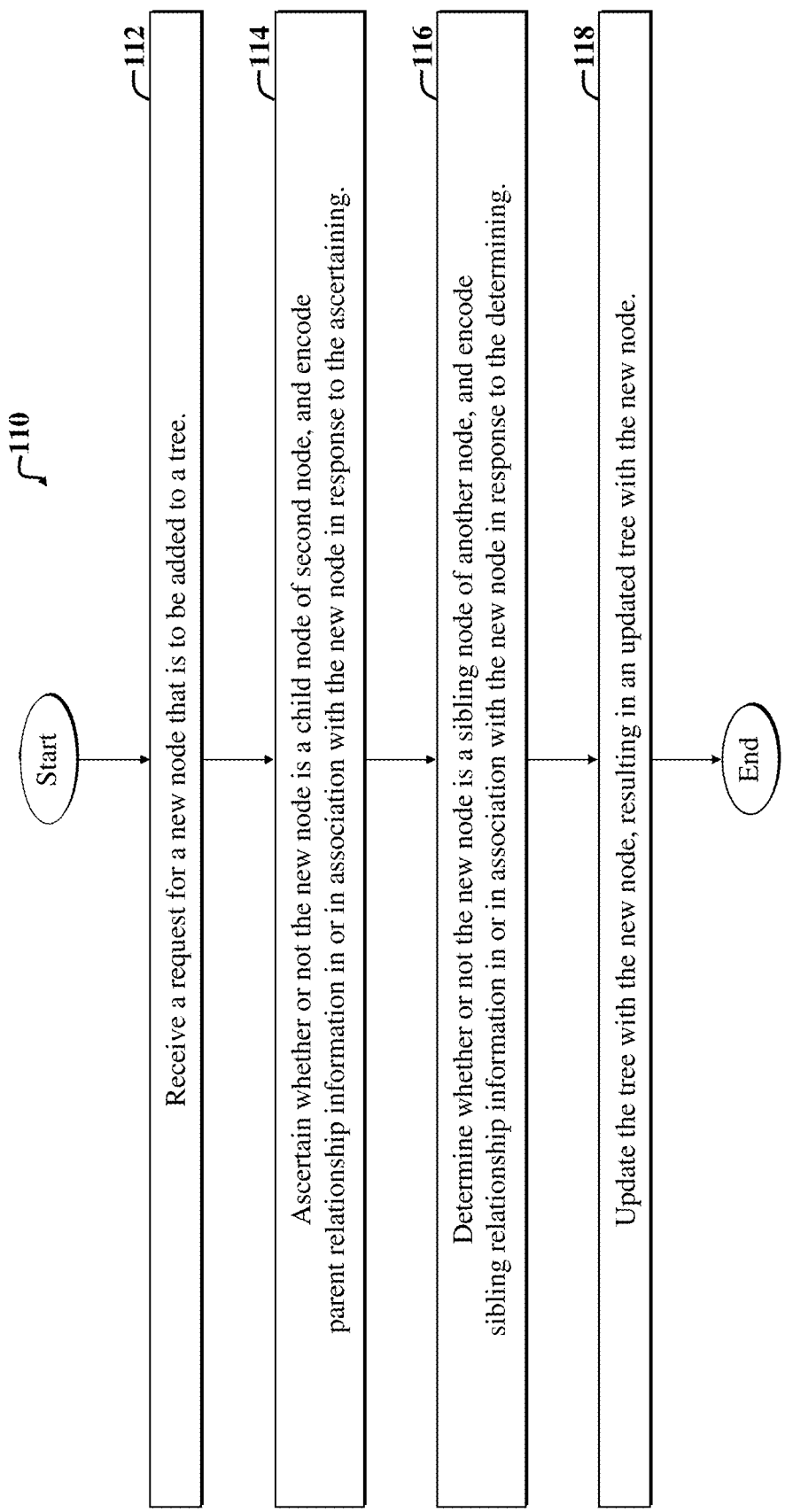
FIG. 5 is a flow diagram of a first example method that is suitable for use with the embodiments of FIGS. 1-4.

FIG. 5 is a flow diagram of a first example method 110 that is suitable for use with the embodiments of FIGS. 1-4. The first example method 110 facilitates efficient tree operations.

A first example step 112 includes receiving a request for a new node is to be added to a tree.

A second example step 114 includes ascertaining whether or not the new node is a child node of a second node, and encoding parent relationship information in or in association with the new node in response to the ascertaining.

A third example step 116 includes determining whether or not the new node is a sibling node of another node, and encoding sibling relationship information in or in association with the new node in response to the determining.

A fourth example step 118 includes updating the tree structure with the new node, resulting in a new tree structure with the new node.

Note that the first example method 110 may be further modified, without departing from the scope of the present teachings. For example, the method 110 may further include determining preexisting metadata describing familial relationship information of the parent node and/or of the sibling node of the new node; and appending, to the familial relationship information, new metadata for the new node describing the parent relationship information and/or sibling relationship information of the new node.

The first example method 110 may further specify that the familial relationship information includes parent relationship information and/or sibling relationship information of the parent node and/or sibling node of the new node. The step of encoding the encoding parent relationship information may further include using one or more symbols to specify the parent relationship information, wherein the one or more symbols are binary symbols; and appending a first binary symbol to preexisting metadata characterizing one or more familial relationships of the parent node and/or the sibling node.

The first example method 110 may further include encoding sibling relationship information by performing the following steps: using one or more binary symbols to specify the sibling relationship information; and appending a first binary symbol to preexisting metadata characterizing one or more familial relationships of the parent node and/or the sibling node.

The first example method 110 may further include detecting a request to perform a relational set operation on the tree; and accessing metadata of leaf nodes of the tree to facilitate performing the relational set operation. In such an embodiment, the metadata of leaf nodes includes a description of one or more branches of the tree and further includes the parent relationship information and the sibling relationship information.

An alternative example method for manipulating a representation of at least a portion of a tree includes traversing the at least a portion of the hierarchical tree from a starting node; and for each traversed node modifying a representation value depending on whether the traversed node is a sibling node or a child node. The representation value may correspond to, for instance, the node metadata 94-104 of FIG. 4 and may be a binary number.

The step of modifying the representation value may further include modifying the representation value by appending a zero or a one to the representation value depending on whether a traversed node is a sibling node or a child node, and more specifically, appending a one to the representation value if the traversed node is a sibling node; and appending a zero to the representation value if the traversed node is a child node.

The alternative example method may further include using the representation value to perform a relational database function, e.g., as may be implemented, in part, using a database query language and associated operators. For instance, the function may include one or more of UNION, INTERSECTION, or DIFFERENCE.

The alternative example method may further include receiving a request for a new node is to be added to the tree; ascertaining whether or not the new node is a child node of second node, and encoding parent relationship information in or in association with the new node in response to the ascertaining; determining whether or not the new node is a sibling node of another node, and encoding sibling relationship information in or in association with the new node in response to the determining; and updating the tree structure with the new node, resulting in a new tree structure with the new node.

That alternative example method may further include determining preexisting metadata describing familial relationship information (e.g., node metadata, such as the node metadata 94-104 of FIG. 4) of the parent node and/or of the sibling node of the new node; and appending, to the familial relationship information, new metadata (e.g., a "1" or a "0") for the new node describing the parent relationship information and/or sibling relationship information of the new node.

The familial relationship information may include parent relationship information and/or sibling relationship information of the parent node and/or sibling node of the new node. The alternative example method may further include detecting a request to perform a relational set operation on the tree; and accessing metadata of leaf nodes of the tree to facilitate performing the relational set operation. The metadata of leaf nodes may include a description of one or more branches of the tree and may further include the parent relationship information and the sibling relationship information.

Accordingly, various embodiments discussed herein may involve encoding, in or in association with, each node of a tree structure, local and non-local structure information describing the tree structure. This facilitates enabling rapid searching of sub-nodes of complex trees, as well as set operations using a database query language, e.g., Structured Query Language (SQL).

In various example embodiments, 'dashed' edges or lines are used instead of traditional direct 'parent-child' lines to show relationships between nodes. The dashed lines correspond to parent-child and/or sibling relationships between nodes. Describing such node familial relationships, e.g., using binary node metadata, brings some useful properties that allow implementation of many tree operations in an easy and well-performing manner. This type of bit-wise representation enables use of efficient, low-level bit operations. For instance, tree structures can now be quickly compared using leaf node metadata.

Figure 6:
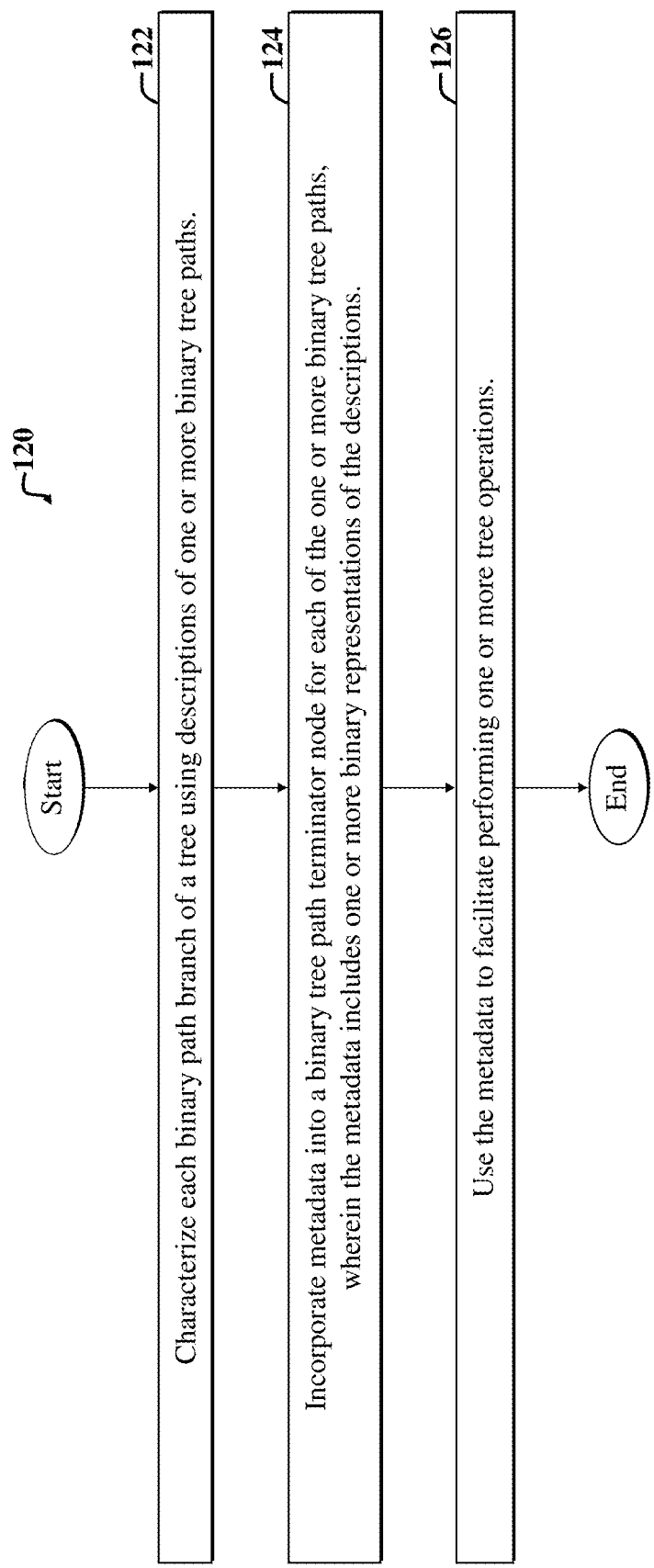
FIG. 6 is a flow diagram of a second example method that is suitable for use with the embodiments of FIGS. 1-5.

FIG. 6 is a flow diagram of a second example method 120 that is suitable for use with the embodiments of FIGS. 1-5. The second example method 120 is adapted to facilitate characterizing a tree for facilitating enhanced computing operations on the tree.

A first tree-characterizing step 122 includes characterizing each binary path branch of a tree using descriptions of one or more binary tree paths. The descriptions may be a collection of binary symbols that incorporate ancestor data for each node along a particular binary path comprising a branch.

A subsequent metadata-incorporating step 124 includes incorporating metadata into a binary tree path terminator node for each of the one or more binary tree paths, wherein the metadata includes one or more binary representations of the descriptions.

Next, a metadata-using step includes using the metadata to facilitate performing one or more tree operations, e.g., relational set operations.

Note that the second example method 120 may be modified or augmented, without departing from the scope of the present teachings. For example, the second example method 120 may further specify that each binary path branch is described by metadata characterizing a binary path terminator node of each of the one or more binary tree paths that represent each branch.

The metadata may further include a binary representation descriptive of each branch at each terminator node. Each terminator node for each of the one or more binary tree paths may represent a youngest leaf node that has no children. The metadata may include information, encoded using binary, describing one or more connections between an oldest child node of a parent node and any younger sibling nodes of the oldest child node.

The information may further include additional binary representations describing one or more sibling relationships between the youngest child node and any immediately older sibling node. Each of the one or more binary tree paths may include tree binary path terminator node, wherein the tree binary path terminator node has no children and represents the youngest child node that is connected directly to it.

Accordingly, a youngest child of a given binary path branch may represent a path terminator node and will include or be associated with ancestry information incorporated using binary metadata.

Note that during building of a given tree (or the re-labeling of a tree with metadata for binary path branches and binary path terminator nodes) every node will have a label (e.g., binary path metadata) enabling recreation of the binary path or branch associated with that node. In certain implementations, for a given tree, only the metadata (describing a particular node's ancestry) for binary path terminators need be stored in or in association with the tree.

Figure 7:
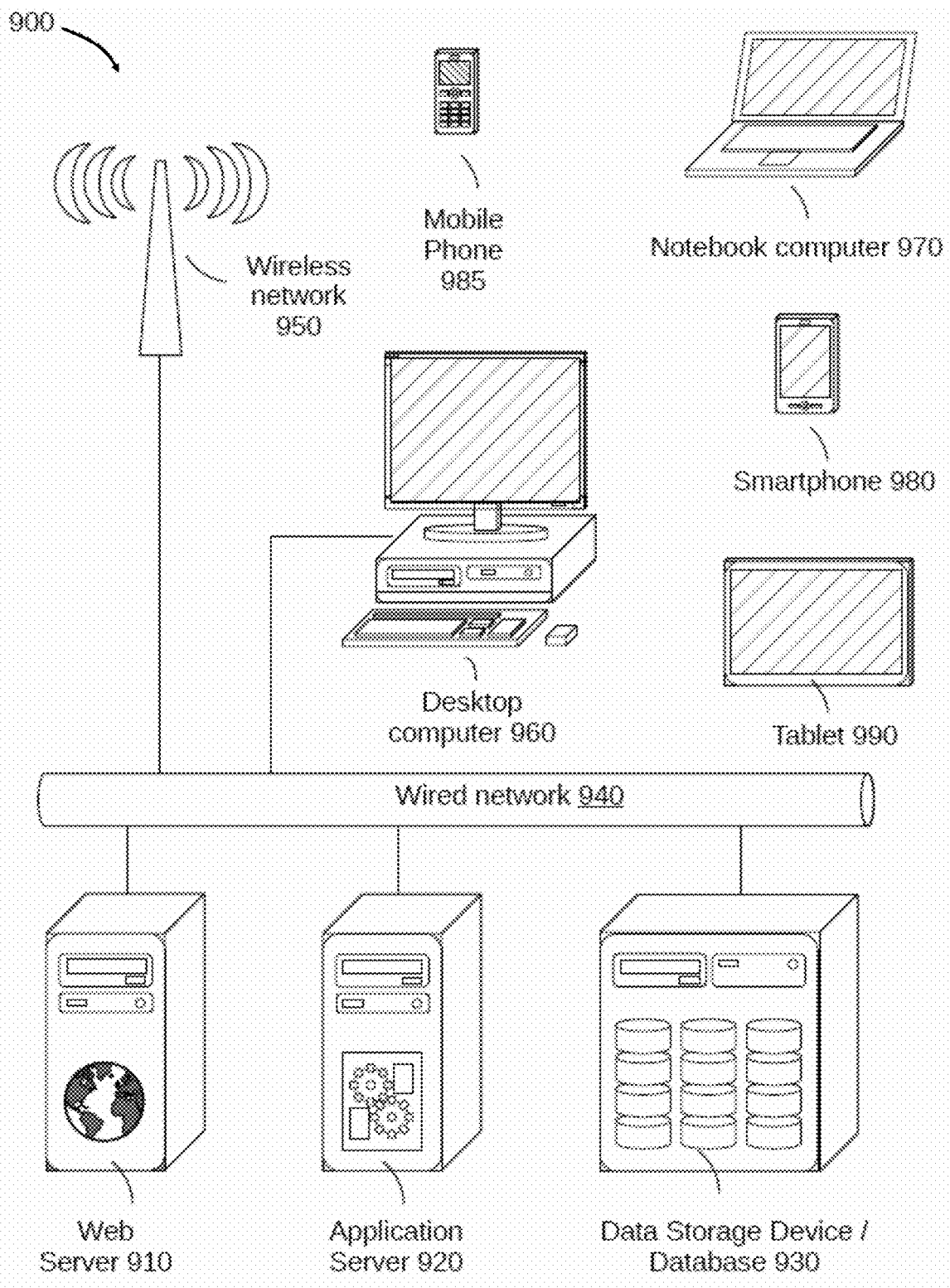
FIG. 7 is a general block diagram of a system and accompanying computing environment usable to implement the embodiments of FIGS. 1-6.

FIG. 7 is a general block diagram of a system 900 and accompanying computing environment usable to implement the embodiments of FIGS. 1-6. Embodiments may be implemented as standalone applications (for example, residing in a user device) or as web-based applications implemented using a combination of client-side and server-side code.

For the purposes of the present discussion, a computing environment may be any collection of computing resources used to perform one or more tasks involving computer processing. A computer may be any processor in communication with a memory. A computing resource may be any component, mechanism, capability, or quantity (or quantities) thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on intranet web servers, databases, files on local hard discs or file servers, email systems, document management systems, portals, and so on. Enterprise computing environments are often networked computing environments.

A networked computing environment may be any computing environment that includes intercommunicating computers, i.e., a computer network. Similarly, a networked software application may be any software application (e.g., a mobile app, desktop browser plugin, etc.) that communicates with one or more computing resources via a computer network.

A given software application may include (but not necessarily) constituent software applications or modules (e.g., services, functions, procedures, computing objects, plugins, extensions, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language).

Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 920, web server 910, and optionally database 930 can be combined into a single server computer application and system. In a further embodiment, virtualization and virtual machine applications may be used to implement one or more of the application server 920, web server 910, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 1 and 6, the client system(s) 12 of FIG. 1 may be implemented via one or more of the desktop computer 960, tablet 990, smartphone 980, notebook computer 970, and/or mobile phone 985 of FIG. 7. The enterprise server system 14 of FIG. 1 and accompanying modules 18-26 may be implemented via the web server 910 and/or application server 920 of FIG. 7. The network 16 of FIG. 1 may be implemented by the wireless network 950 and/or the wired network 940 of FIG. 7. The database systems 18 of FIG. 1 may be implemented using the data storage device 930 of FIG. 7.

Figure 8:
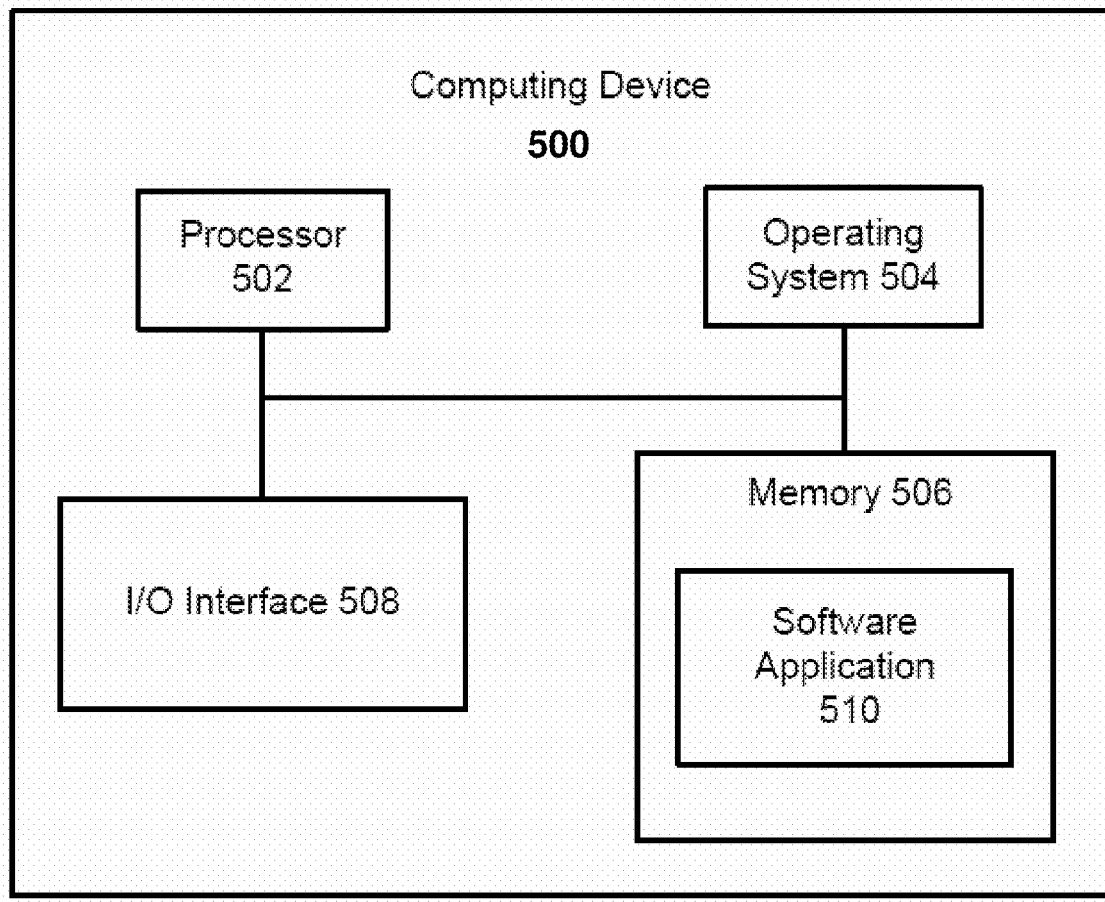
FIG. 8 is a general block diagram of a computing device usable to implement the embodiments of FIGS. 1-6.

FIG. 8 illustrates a block diagram of an example computing device or system 500, which may be used for implementations described herein. For example, the computing 500 may be used to implement server devices 910, 920 of FIG. 7 as well as to perform the method implementations described herein. In some implementations, the computing device 500 may include a processor 502, an operating system 504, a memory 506, and an input/output (I/O) interface 508.

In various implementations, the processor 502 may be used to implement various functions and features described herein, as well as to perform the method implementations described herein. While the processor 502 is described as performing implementations described herein, any suitable component or combination of components of the computing device 500 or any suitable processor or processors associated with the device 500 or any suitable system may perform the steps described. Implementations described herein may be carried out on a user device, on a server, or a combination of both.

The example computing device 500 also includes a software application 510, which may be stored on memory 506 or on any other suitable storage location or computer-readable medium. The software application 510 provides instructions that enable the processor 502 to perform the functions described herein and other functions. The components of computing system 500 may be implemented by one or more processors or any combination of hardware devices, as well as any combination of hardware, software, firmware, etc.

For ease of illustration, FIG. 7 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, the computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein are applied to tree structures, note that other types of data structures with different relationships between data elements or objects may be adapted to employ methods discussed herein, without departing from the scope of the present teachings. For example, mesh networks, with nodes that are not necessarily hierarchically related, may be augmented with bit-wise metadata as discussed herein, thereby enabling enhanced network communication efficiencies, without departing from the scope of the present teachings. Furthermore, while metadata for tree nodes is represented using binary in specific embodiments, embodiments are not limited thereto. For instance, another type of encoding, e.g., base-3 encoding, may be employed instead, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory tangible processor-readable medium including instructions executable by one or more processors, and when executed operable for:
    traversing at least a branch portion of a tree of nodes stored in a relational database, from a starting node;
    for each traversed node, modifying a binary path representation stored in the individual nodes or in the relational database as being associated with the individual nodes, as metadata for each traversed node, according to a process in which older child nodes are appended with a first binary symbol, wherein older child nodes are directly connected to a parent node, and younger sibling nodes are appended with a second binary symbol, wherein younger sibling nodes are connected to a parent node through an older child node that is an older sibling;
    determining that a present traversed node is a younger sibling node,
        wherein modifying the binary path representation of the younger sibling node includes appending the second binary symbol to the binary path representation of an immediate older sibling node of the younger sibling node, and
        wherein the younger sibling node is on a same level of the tree as the immediate older sibling node and if the immediate older sibling node has a parent node, the younger sibling node shares the parent node;
    determining that a subsequent traversed node is a terminator node of the at least branch portion, wherein the terminator node has no younger sibling and has no child node;
        wherein the binary path representation of the terminator node includes the binary path representation of each traversed node in the at least branch portion including and the binary path representation of the younger sibling node;
    detecting a request to perform a relational set operation on the tree; and
    performing the relational set operation by accessing metadata of binary path terminator nodes of the tree.

2. The non-transitory tangible processor-readable medium of claim 1, wherein the first binary symbol is a one appended to the binary path representation of a sibling node; and the second binary symbol is a zero appended to the binary path representation of a an older child node.

3. The non-transitory tangible processor-readable medium of claim 1, wherein the relational set operation includes one or more of UNION, INTERSECTION, or DIFFERENCE.

4. The non-transitory tangible processor-readable medium of claim 1, wherein the instructions are further operable for:
receiving a request for a new node to be added to the tree;
ascertaining whether or not the new node is an older child node of a second node, and
encoding parent relationship information in or in association with the new node in response to ascertain that the new node is the older child node;
determining whether or not the new node is a sibling node of another node, and
encoding sibling relationship information in or in association with the new node in response to the determining that the new node is the sibling node; and
updating the tree with the new node, resulting in a new tree with the new node.

5. The non-transitory tangible processor-readable medium of claim 4, wherein the instructions are further operable for:
determining preexisting metadata describing familial relationship information of at least one of the parent node or the sibling node of the new node; and
based on the determined preexisting metadata, appending, to the familial relationship information, new metadata for the new node describing the respective parent relationship information or the sibling relationship information of the new node.

6. The non-transitory tangible processor-readable medium of claim 5, wherein the familial relationship information includes at least one of parent relationship information or sibling relationship information of the respective parent node or sibling node of the new node.

7. A method for manipulating a representation of at least a portion of a tree, the method comprising:
traversing at least a branch portion of the tree of nodes stored in a relational database, from a starting node;
for each traversed node, modifying a binary path representation stored in the individual nodes or in the relational database as being associated with the individual nodes, as metadata for each traversed node, according to a process in which older child nodes are appended with a first binary symbol, wherein older child nodes are directly connected to a parent node, and younger sibling nodes are appended with a second binary symbol, wherein younger sibling nodes are connected to a parent node through an older child node that is an older sibling;
determining that a present traversed node is a younger sibling node,
wherein modifying the binary path representation of the younger sibling node includes appending a binary symbol to the binary path representation of an immediate older sibling of the younger sibling node, and
wherein the younger sibling node is on a same level of the tree as the immediate older sibling node and if the immediate older sibling node has a parent node, the younger sibling node shares the parent node;
determining that a subsequent traversed node is a terminator node of the at least branch portion, wherein the terminator node has no younger sibling and has no child node;
wherein the binary path representation of the terminator node includes the binary path representation of each traversed node in the at least branch portion including and the binary path representation of the younger sibling node;
detecting a request to perform a relational set operation on the tree; and
performing the relational set operation by accessing metadata of binary path terminator nodes of the tree.

8. The method of claim 7, further comprising:
modifying the binary path representation by appending a first binary symbol to the binary path representation for a traversed node that is a sibling node and a second binary symbol to the binary path representation for a traversed node that is an older child node.

9. The method of claim 8, further comprising:
appending a one to the binary path representation if a traversed node is a sibling node; and
appending a zero to the binary path representation if a traversed node is an older child node.

10. The method of claim 7, wherein the relational set operation includes one or more of UNION, INTERSECTION, or DIFFERENCE.

11. The method of claim 7, further including
receiving a request for a new node to be added to the tree;
ascertaining whether or not the new node is an older child node of a second node;
encoding parent relationship information in or in association with the new node in response to the ascertaining that the new node is the older child node;
determining whether or not the new node is a sibling node of another node;
encoding sibling relationship information in or in association with the new node in response to the determining that the new node is the sibling node; and
updating the tree with the new node, resulting in a new tree with the new node.

12. The method of claim 11, further including:
determining preexisting metadata describing familial relationship information of one of the parent node or the sibling node of the new node; and
based on the determined preexisting metadata, appending, to the familial relationship information, new metadata for the new node describing the respective parent relationship information or the sibling relationship information of the new node.

13. An apparatus comprising:
one or more processors; and
logic encoded in one or more tangible media for execution by the one or more processors and when executed operable for:
traversing at least a branch portion of a tree of nodes stored in a relational database, from a starting node; and
for each traversed node, modifying a binary path representation stored in the individual nodes or in the relational database as being associated with the individual nodes, as metadata for each traversed node, according to a process in which older child nodes are appended with a first binary symbol, wherein older child nodes are directly connected to a parent node, and younger sibling nodes are appended with a second binary symbol, wherein younger sibling nodes are connected to a parent node through an older child node that is an older sibling;
determining that a present traversed node is a younger sibling node,
wherein modifying the binary path representation of the younger sibling node includes appending a binary symbol to the binary path representation of an immediate older sibling node of the younger sibling node, and wherein the younger sibling node is on a same level of the tree as the immediate older sibling node and if the immediate older sibling node has a parent node, the younger sibling node shares the parent node;

determining that a subsequent traversed node is a terminator node of the at least branch portion, wherein the terminator node has no younger sibling and has no child node;

wherein the binary path representation of the terminator node includes the binary path representation of each traversed node in the at least branch portion including and the binary path representation of the younger sibling node;

detecting a request to perform a relational set operation on the tree; and performing the relational set operation by accessing metadata of binary path terminator nodes of the tree.

14. The tangible processor-readable medium of claim 1, wherein the tree is a sub-tree of a larger tree and wherein the instructions are further operable for:
using the binary path representation to search for patterns in the sub-tree.

15. The method of claim 7, wherein the tree is a sub-tree of a larger tree and wherein the method further comprise:
using the binary path representation to search for patterns in the sub-tree.

16. The tangible processor-readable medium of claim 1, wherein edges for a relationship between a parent node and an older child node is encoded in the relational database without encoding a relationship between the parent and younger child nodes.

* * * * *

UNITED STATES PATENT AND TRADEMARK OFFICE
CERTIFICATE OF CORRECTION

| | | |
|---|---|---|
| PATENT NO. | : 11,416,473 B2 | |
| APPLICATION NO. | : 16/808152 | |
| DATED | : August 16, 2022 | |
| INVENTOR(S) | : Evgueni Perkov | |

It is certified that error appears in the above-identified patent and that said Letters Patent is hereby corrected as shown below:

On the Title Page

Column 1, under item (54) Title, Line 4, delete "HIERARCHIAL" and insert -- HIERARCHICAL --, therefor.

In the Specification

In Column 1, Line 4, delete "HIERARCHIAL" and insert -- HIERARCHICAL --, therefor.

In the Claims

In Column 19, Line 3, in Claim 2, delete "of a an" and insert -- of an --, therefor.

In Column 22, Line 3, in Claim 14, before "tangible" insert -- non-transitory --, therefor.

In Column 22, Line 12, in Claim 16, before "tangible" insert -- non-transitory --, therefor.

Signed and Sealed this
Sixth Day of August, 2024

Katherine Kelly Vidal
*Director of the United States Patent and Trademark Office*